Oct. 30, 1934.  W. H. BALZER  1,978,855
ELECTRIC MOTOR
Filed July 13, 1932
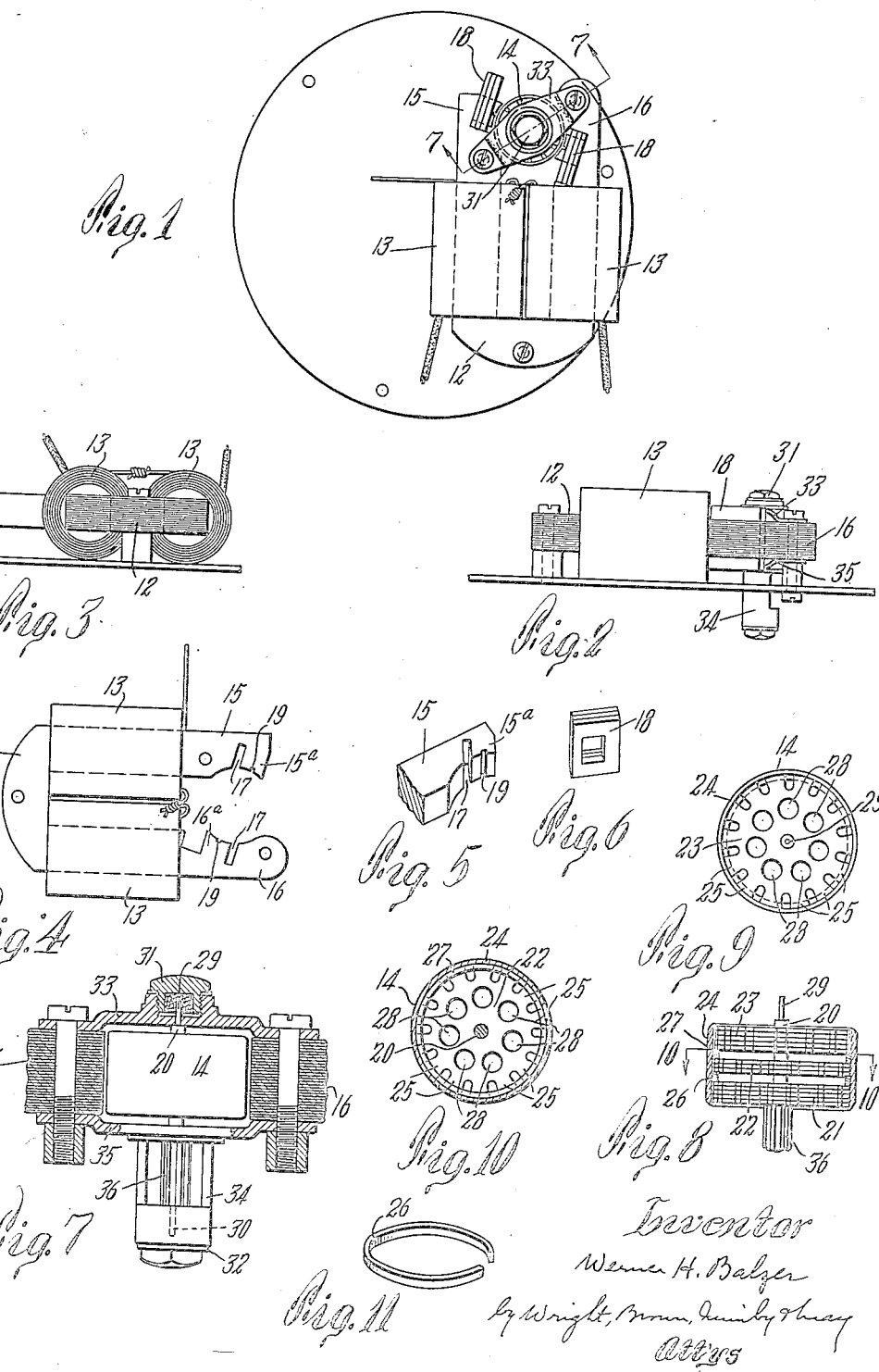

Patented Oct. 30, 1934

1,978,855

UNITED STATES PATENT OFFICE 1,978,855

ELECTRIC MOTOR

Werner H. Balzer, Waltham, Mass., assignor to Waltham Watch Company, Waltham, Mass., a corporation of Massachusetts Application July 13, 1932, Serial No. 622,247

4 Claims. (Cl. 172—275)

The present invention relates to alternating current electric motors. Its object is to provide such a motor which will start from a position of rest whenever alternating current is passed through the field winding and will run in synchronism with the alternations of the current but at a rate which is a fractional part of the current frequency. An important part of my object has been to insure both an absolute and invariable ratio between the rate of running of the motor and the current frequency, and also certainty of automatic starting and falling into step with the current; and to obtain these results by a construction of utmost simplicity which can be made and assembled at low cost.

Motors embodying this invention may be manufactured in various sizes and applied for many purposes. One of such purposes is the driving of electric clocks, and the embodiment of the invention which I have chosen for illustration herein is a motor of dimensions and proportions suitable for operating a mantel or wall clock. The proportions and dimensions so illustrated, however, are not limitations in the scope of the invention or of the protection which I claim.

In the drawing Figure 1 is a rear elevation of a clock movement with a motor embodying this invention applied to the back plate thereof.

Figure 2 is a side elevation of the motor and a fragment of the back plate as seen from the right of Figure 1.

Figure 3 is an elevation of the same as viewed from the under side of Figure 1 and from the left of Figure 2.

Figure 4 is an elevation of the field magnet and windings of the motor.

Figure 5 is a perspective fragmentary view of one of the poles of the field magnet.

Figure 6 is a perspective view of the shading coil adapted for application to the pole piece shown in Figure 5.

Figure 7 is a sectional view of the rotor and adjacent field poles of the motor taken on line 7—7 of Figure 1 and represented on an enlarged scale.

Figure 8 is a sectional elevation of the rotor showing its outer shell and interior spacing rings in section and its interior laminations or disks in elevation.

Figure 9 is an end view of the rotor.

Figure 10 is a cross section of the rotor taken on line 10—10 of Figure 8.

Figure 11 is a perspective view, partly broken away, of one of the interior spacing rings of the rotor.

The motor comprises essentially a field magnet 12, having parallel legs surrounded by field coils 13—13, and a rotor 14. The magnet core is made of soft iron laminations and terminates in poles 15 and 16 which are formed concave on their faces next to the motor. The poles are partially divided by slots 17 to create pole sections 15a and 16a which are surrounded by shading coils 18, the purpose and function of which are well known. In addition, the faces of the pole sections 15a and 16a are each intersected by a notch 19 to cause concentration of lines of magnetic force in areas corresponding in width approximately to the width of the polar segments, later described, of the rotor.

The rotor is constructed of a central shaft or staff 20, a series of iron disks 21, 22, 23, and a shell 24 of copper or other electrically conductive metal suitable for the purpose. The shell provides a field for induced eddy currents which tend to start the rotor and maintain it in motion. The internal disks regulate the speed of rotation.

These disks are notched at the circumference to form polar segments 25, the number of which determines the proportional rate of rotation. That is, the number of revolutions of the rotor is a fraction of the number of current reversals equal to the reciprocal of the number of such polar segments. I have found that a rotor of which the central part is made up of such disks has extremely strong synchronizing tendencies; so strong that once the speed is in step with the current, the rotor will continue at the exactly ordained speed ratio without slip. But the disks also have a strong locking tendency, such that if all of the disks are alike and positioned with their polar segments all in registry with one another, and if the rotor stops with polar segments in the field of greatest magnetic concentration, the magnetic locking tendency is stronger than the starting tendency and the rotor then does not start automatically from a position of rest.

But I have found that by placing a minor proportion of the disks or laminations in a staggered position with respect to the majority of the disks (i. e., with the polar segments of one group crossing the circumferential notches of the other group and vice versa) a biasing effect is exerted when the rotor comes to rest upon interruption of the current so that the rotor in stopping takes a position where none of its poles are exactly in the strongest magnetic field. Thus not only is the extreme locking tendency avoided, but the disks themselves exert a certain amount of starting torque additional to that exerted by the outer shell, when the current is turned on. But the biasing disks or laminations (as those of the above mentioned minor group may be called for convenient definition) are not numerous or powerful enough to disturb the synchronizing tendency. Thus the rotor is made definitely and certainly self-starting, and automatically synchronizing at a fractional rate of the current frequency.

I have found that in practice a ratio of the number and mass of the biasing disks to that of the synchronizing disks in the proportion of 5 to 8 is sufficient, and appears to be the optimum ratio. As the disks are all alike in thickness, diameter and depth of peripheral notches, their number is a correct measure of their total mass.

Preferably the biasing disks are assembled in a group (23) rather than being interspersed among the synchronizing disks. The latter are separated into two groups, one of which (21) contains a number of disks equal to the number of biasing disks and is located at the opposite end of the rotor from the latter, and the other group 22 is centrally disposed between the other two. The three groups are separated from one another by spacing rings 26 and 27 which fit inside the shell 24. This arrangement is adopted for balance and minimum weight while giving to the rotor a length in the axial direction equal to the width of the magnetic poles in the same direction. But variations in these particulars may be made without departing from the invention.

By reference to Figure 8 the alinement of peripheral notches of the groups 21 and 22, and the staggered relation thereto of the notches in the group 23 will be plainly seen. The shell 24 is an annular band slightly wider in the axial direction of the rotor than the assemblage of disks, and its edges are spun or bent over the outermost disks to secure them in place.

All of the disks are formed with holes 28 inward from the circumference and symmetrically arranged about the center. Such holes of all the disks of the same rotor are alined with one another. They serve to lighten the weight of the rotor, but have also an important function in facilitating assemblage of the disks. With the aid of pins properly spaced to enter certain ones of the holes, all the disks of a rotor may be quickly and accurately assembled with the notches of certain ones accurately alined with one another and those of different other disks correctly staggered.

The opposite ends of the rotor shaft are provided with pivots 29, 30 seated in bearings 31 and 32, the former of which is mounted on a bridge 33 secured to the pole pieces and the latter in a potence 34 which projects from a similar bridge 35. This arrangement provides scope for a pinion 36, carried by the shaft 20, to mesh with a gear wheel in a time piece.

Appropriate modifications and variations may be made in the dimensions and proportions of the parts herein described, and in accessory details, as needed to adapt the invention for other uses, within the scope of the invention.

What I claim and desire to protect by Letters Patent is:

1. An alternating current electric motor having a rotor composed of a number of iron disks having peripheral polar segments and a surrounding shell of copper, said disks being arranged in groups containing respectively unequal numbers and the disks of each group being arranged with their polar segments in alinement and in staggered relation to those of the other group.

2. A rotor for an alternating current motor consisting of an annular shell, two groups of axially alined disks of magnetic metal within said shell, said groups being equal to one another and located within respectively opposite end zones of the shell, having peripheral polar segments of which those in each group are alined with one another and staggered with respect to those of the other group, and an intermediate group of disks midway between the first named groups having polar segments alined with those of one of said groups.

3. A rotor of the character described comprising a shaft, a coaxial continuous shell of conducting metal, a series of disks of magnetic metal strung on said shaft within the shell and enveloped by the latter, said disks having peripheral polar projections, a major proportion of said disks having such projections in axial alinement with one another, and a minor proportion of the disks having their polar projections spaced angularly midway between the polar projections of said major proportion of disks.

4. A rotor of the character described comprising a shaft, a coaxial continuous shell of conducting metal, a series of disks of magnetic metal strung on said shaft within the shell and enveloped by the latter, said disks having peripheral polar projections, a major proportion of said disks having their polar projections in axial alinement with one another, and a minor proportion of the disks having their polar projections spaced angularly midway between the polar projections of said major proportion, groups of said disks being separated from one another, and spacing rings fitted within said shell and located between said separated groups.

WERNER H. BALZER.